(12) United States Patent
Amei

(10) Patent No.: US 6,542,388 B2
(45) Date of Patent: Apr. 1, 2003

(54) INTERMITTENT SWITCHING POWER SUPPLY CIRCUIT

(75) Inventor: Toshihiro Amei, Toyama-ken (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 09/978,172

(22) Filed: Oct. 15, 2001

(65) Prior Publication Data

US 2002/0089862 A1 Jul. 11, 2002

(30) Foreign Application Priority Data

Oct. 20, 2000 (JP) .................................. 2000-320344

(51) Int. Cl.[7] .................... H02H 7/122; H02M 3/335
(52) U.S. Cl. ................. 363/56.01; 363/19; 363/56.09; 363/56.11
(58) Field of Search .................. 363/18, 19, 55, 363/56.01, 56.09, 56.1, 56.11, 97

(56) References Cited

U.S. PATENT DOCUMENTS

| 4,130,862 A | | 12/1978 | Holt ............................. 363/49 |
| 5,140,511 A | | 8/1992 | Lee et al. ....................... 363/21 |
| 5,412,555 A | * | 5/1995 | Uramoto ....................... 363/18 |
| 6,101,103 A | * | 8/2000 | Miyazaki et al. .............. 363/19 |
| 6,104,622 A | * | 8/2000 | Shin ............................. 363/56 |
| 6,212,079 B1 | * | 4/2001 | Balakrishnan et al. ........ 363/97 |
| 6,288,914 B1 | * | 9/2001 | Sato ............................. 363/18 |

FOREIGN PATENT DOCUMENTS

| DE | 27 00 547 | 7/1978 | ............ H02H/3/04 |
| DE | 197 11 771 | 10/1998 | ............ H02H/7/12 |
| EP | 0 610 539 | 8/1994 | .......... H02M/3/335 |
| JP | 1127 5857 | 10/1999 | ............ H02M/3/28 |

* cited by examiner

*Primary Examiner*—Bao Q. Vu
(74) *Attorney, Agent, or Firm*—Darby & Darby

(57) ABSTRACT

An intermittent switching power supply circuit prevents excessive output power on a secondary side of a circuit. An intermittent oscillator is alternately switched on and off to maintain output voltage and/or current roughly constant. An output power monitoring circuit monitors output power from a rectifying/smoothing circuit. A control circuit outputs a stop control signal to an control terminal of the intermittent oscillator when the output power monitoring circuit determines that the output voltage and/or current exceeds a reference value. The protection circuit and a photocoupler receiver element are connected in parallel with the control circuit. Where a circuit error occurs and the photocoupler receiver element fails to cycle the intermittent oscillator between active and inactive conditions for a predetermined time, the protection circuit provides a backup which outputs a stop control signal to stop oscillation of the intermittent oscillator element.

13 Claims, 4 Drawing Sheets

Fig. 5        Prior Art
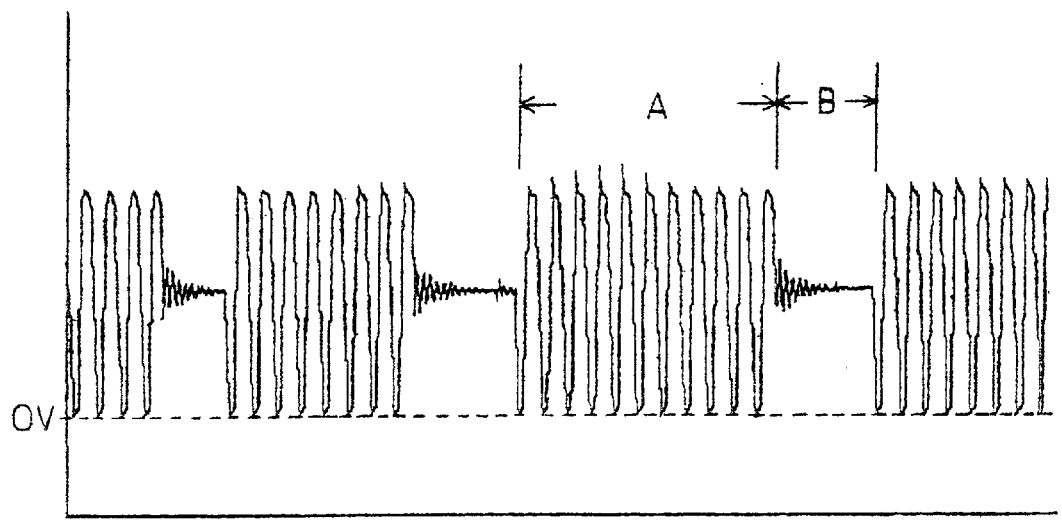
Fig. 6        Prior Art
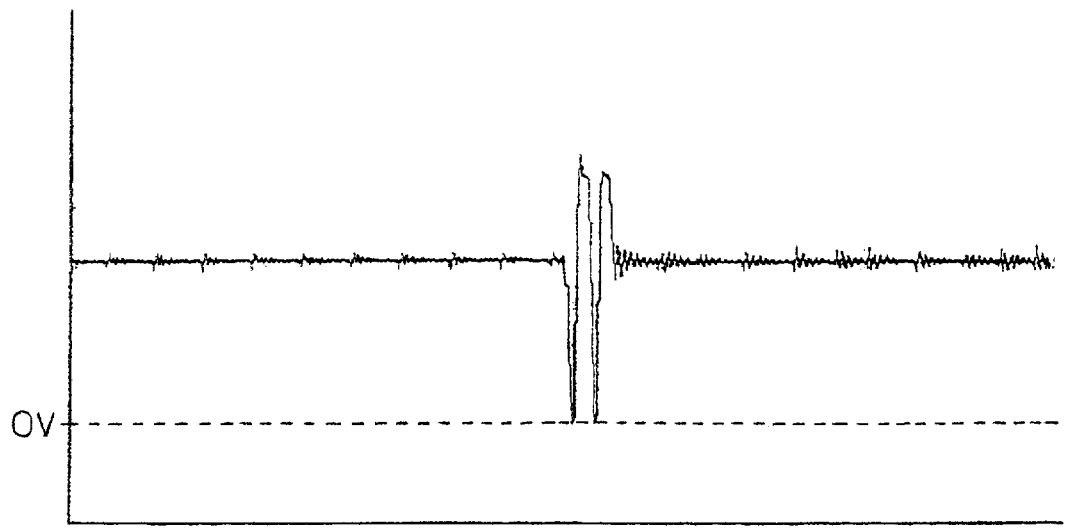

INTERMITTENT SWITCHING POWER SUPPLY CIRCUIT

BACKGROUND OF THE INVENTION

1. Field of the Invention

The present invention relates to an intermittent switching power supply circuit which stabilizes output from a secondary output winding by controlling periodic oscillation intervals of a primary winding. More specifically, the present invention relates to an intermittent switching power supply circuit that avoids output excessive power from its secondary output winding during element malfunction.

2. Description of the Related Art

It is known that some types of intermittent switching power supply circuits are used as stabilized power supplies in AC adapters and battery chargers.

Referring now to FIG. 4, an example of a prior art intermittent switching power supply circuit 100 includes an input side and an output side. Simply stated, intermittent power supply circuit 100 enables oscillation of an oscillator when output voltage and/or current drop below thresholds, and inhibits oscillation when output voltage and/or current increases beyond slightly higher thresholds. During oscillation, power is stored in reactive (capacitive/inductive) components. The stored power is then fed as DC power to using circuits including times when oscillation is stopped.

On the input side, a direct current power supply 1, illustrated as a battery, is an unstable power supply whose output voltage varies depending on load. Direct current power supply 1 includes a high-voltage terminal 1a and a low-voltage terminal 1b.

A transformer 2 includes a primary winding 2a and a secondary output winding 2b. One end of primary winding 2a is connected to high-voltage terminal 1a. An intermittent oscillator 3 is connected between the second terminal of primary winding 2a and low-voltage terminal 1b.

Intermittent oscillator 3 includes the conventional elements of an oscillator, a control element, and a switching element (all not shown). The switching element alternately turns on and turns off current to primary winding 2a of transformer 2. Intermittent oscillator 3 oscillates at a fixed frequency. Intermittent oscillator 3 stops oscillation when a stop control signal, in the form of a fixed current, is received at a control terminal 3a.

A photocoupler receiver element 39 is photocoupled to a photocoupler emitter element 35 disposed on the output side. Photocoupler receiver element 39 is connected between control terminal 3a of intermittent oscillator 3 and low-voltage terminal 1b of direct current power supply 1. When photocoupler receiver element 39 is energized by an optical signal from photocoupler emitter element 35, it applies the, required fixed current to control terminal 3a to turn off oscillation. In the absence of energization of photocoupler receiver element 39, intermittent oscillator 3 is enabled to oscillate.

A rectifier diode 4 and a smoothing capacitor 13 form a rectifying/smoothing circuit. The rectifying/smoothing circuit rectifies and smooths the AC signal from output winding 2b. Energy stored in the reactive elements are fed to the remainder of the circuit during periods of non-oscillation of intermittent oscillator 3. The smoothed result is connected to a high-voltage output line 20a and a low-voltage output line 20b. A Zener diode 14 provides an output voltage clamp to limit the voltage across smoothing capacitor 13 to the breakdown voltage of Zener diode 14.

An output monitoring circuit is disposed between output lines 20a, 20b. The output monitoring circuit includes a voltage monitoring circuit and a current monitoring circuit, described later. The output monitoring circuit energizes photocoupler emitter element 35 when the output voltage or the output current exceeds a predetermined reference voltage or current. Energization of photocoupler emitter element 35 turns of oscillation of intermittent oscillator 3, as described above.

The voltage monitoring circuit includes a pair of voltage divider resistors 30, 31 connected in series between high-voltage output line 20a and low-voltage output line 20b. An intermediate tap 32 obtains divided output voltage. The divided output voltage is connected to an inverse input terminal of an error amplifier 33a.

A DC voltage monitoring reference power supply 34a, illustrated as a battery, is connected between an uninverted input terminal of error amplifier 33a and low-voltage output line 20b.

Error amplifier 33a is a threshold circuit which compares the first comparison voltage input to the uninverted input terminal with the divided output voltage input to the inverted input terminal. The output of error amplifier 33a switches between its high and low values when the value of the voltage fed to its inverted input becomes more or less than the divided value fed to its uninverted input. The point at which the switch takes place is set by adjustment of the resistance values of voltage divider resistors 30, 31 or by adjustment of the first comparison voltage of monitoring reference power supply 34a.

The output of error amplifier 33a is connected to an anode of photocoupler emitter element 35. Photocoupler emitter element 35 is connected through a resistor 36 to high-voltage output line 20a to provide it with a power supply. A resistor 37a and a capacitor 38a, connected in series, serve as an AC negative feedback element to provide stable operation of error amplifier 33a.

The output of error amplifier 33a switches between a voltage near the voltage of low-voltage output line 20b and a voltage near the voltage of high-voltage output line 20a. When the output of error amplifier 33a is high (near the voltage of high-voltage output line 20a), insufficient voltage exists across photocoupler emitter element 35 for energization thereof. In this condition, oscillation of intermittent oscillator 3 is enabled. When the output of error amplifier 33a is low (near the voltage of low-voltage output line 20b), substantially the entire voltage difference between high-voltage line 20a and low-voltage output line 20b (minus voltage drops in resistor 36, and other elements) is available to energize photocoupler emitter 35. As a result, oscillation of intermittent oscillator 3 is inhibited.

The current monitoring circuit operates in a manner similar to the voltage monitoring circuit described above. A current detection resistor 43 is connected in series with low-voltage output line 20b. One end of current detection resistor is 43 connected to an inverted input terminal of an error amplifier 33b. The second end of current detection resistor 42 is connected to the uninverted input terminal through a current monitoring reference power supply 34b (illustrated as a battery).

The potential difference between the terminals of current detection resistor 43 is proportional to the output current flowing through low-voltage output line 20b. Error amplifier 33b compares voltage across current detection resistor 43 with a second comparison voltage from current monitoring reference power supply 34b to determine whether a predetermined reference current has been exceeded. The value of the reference current may be set by either adjusting the resistance of current detection resistor 43 or by adjusting the second comparison voltage of current monitoring reference power supply 34b.

The output of error amplifier 33b is connected to a connection point between the output of error amplifier 33a (monitoring the output voltage), and photocoupler emitter element 35. In a manner identical to voltage error amplifier circuit 33a, current error amplifier circuit 33b energizes and de-energize photocoupler emitter element 35 in response to the current in the low-voltage output line 20b being greater or less than, respectively, the selected threshold voltage.

Serially connected resistor 37a and capacitor 38a, along with a resistor 37b and a capacitor 38b, serve as AC negative feedback elements which stabilize the operation of error amplifier 33a and error amplifier 33b, respectively.

During operation of intermittent switching power supply circuit 100, intermittent oscillator 3 oscillates at a fixed frequency. The output power from secondary output winding 2b increases as long as the output power and the output current on the secondary side remain below the predetermined reference value.

During operation, intermittent oscillator 3 is switched between oscillation and non-oscillation to maintain a roughly constant output voltage and/or current. When the load connected to high-voltage output line 20a and low-voltage output line 20b increases beyond the reference voltage, the divided voltage applied to the uninverted input terminal of error amplifier 33a increases. When the voltage at its inverted input exceeds the voltage at its uninverted input, error amplifier 33a is switched off (lowest output voltage). As a result, the voltage across photocoupler emitter 35 increases beyond the emission threshold of photocoupler emitter 35. As a consequence, photocoupler emitter 35 produces an optical signal which turns on photocoupler receiver element 39. As a consequence, intermittent oscillator 3 is turned off momentarily. When the output voltage decreases below the threshold, photocoupler emitter 35 is turned off, thereby permitting photocoupler receiver to turn off intermittent oscillator 3. During non-oscillation of intermittent oscillator 3, power stored in reactive components continues to be fed to using circuits. This procedure continues with intermittent oscillator 3 being alternately turned on and off as needed to maintain the output voltage roughly constant regardless of load.

A similar operation is performed by error amplifier 33b in response to increasing and decreasing current. As a result, as the output voltage and/or output current increase and decrease about their respective reference value, with photocoupler emitter element 35 turning on and off to continuously output a limit signal to photocoupler receiver element 39 for maintaining the voltage and current values roughly constant.

When receiving a limit signal from photocoupler emitter element 35, photocoupler receiver element 39 causes a fixed current to flow from control terminal 3a to low-voltage terminal 1b of direct current power supply 1. This constitutes a "stop" signal applied to control terminal 3a. As a result, intermittent oscillator 3 stops oscillation until the "stop" control signal is no longer received, i.e., until the flow of fixed current is stopped.

When oscillation of intermittent oscillator 3 stops, secondary output winding 2b of intermittent oscillator 3 does not receive additional output power. The voltage is maintained by energy stored in the capacitive and reactive element of the filter following transformer 2. When the output voltage and/or current decreases below their respective reference, control terminal 3a receives a "go" signal (absence of current) from photoconductor receiving element 39, thereby initiating a cycle of oscillation.

As a result of the respective decrease of voltage or current below the reference value, photocoupler emitter element 35 stops emitting light, and photocoupler receiver element 39 no longer receives the limit signal. In response, intermittent oscillator 3 resumes oscillation and stable output appropriate for the load power is generated.

Referring now to FIG. 5, a graph indicates the voltage at the terminals of intermittent oscillator 3 at a load of 3 W and 6 V output voltage, and a 0.5 A output current from output lines 20a, 20b. As described above, oscillation starts and stops (is limited) below and above the 3 W load, respectively.

During operation, if output lines 20a, 20b are shorted or experience current irregularity, output current immediately exceeds the reference current and oscillation stops. In this manner, if the load is increased, an oscillation interval A is longer than a rest interval B. Conversely, if the load is reduced, oscillation interval A is shorter than rest interval B. By varying the duty cycle of intermittent oscillation, output voltage and output current are controlled in a roughly stable manner according to the load.

Referring additionally now to FIG. 6, a graph shows the voltage appearing at the terminals of intermittent oscillator 3 with no load, but with output lines 20a, 20b insulated from each other. The result is a 6 V output voltage and with 0 A output current. Oscillation remains stopped, except for widely separated short cycles of oscillation of intermittent oscillator 3 to overcome leakages in the output circuit. A very short oscillation cycle is sufficient to generate quickly sufficient induced electromotive force in secondary output winding 2b to cause the output voltage to exceed the reference voltage almost immediately.

In intermittent switching power supply circuit 100, stable output power and output current, based on the load, are provided through the output monitoring circuit. The output monitoring circuit is formed from the voltage monitoring circuit, the current monitoring circuit, and photocoupled photocoupler emitter element 35 and photocoupler receiver element 39. Unfortunately, responsiveness to irregularities is inadequate.

As an example of inadequate response, where a circuit elements breaks or malfunctions, so that the current flowing through control terminal 3a of intermittent oscillator 3 stops, oscillation continues and excessive power is developed on the secondary side. The excessive power leads to excessive heat, equipment degradation, circuit failure, and other undesirable problems.

OBJECTS AND SUMMARY OF THE INVENTION

The object of the present invention to provide an intermittent switching power supply circuit which overcomes the problems described above.

It is another object of the present invention to provide an intermittent switching power supply circuit with a second backup limit signal to protect the circuit from circuit element failure.

It is another object of the present invention to provide an intermittent switching power supply circuit formed by adding a simple protection circuit to a conventional circuit structure which eliminates excessive output power even if circuit elements break.

Briefly stated, the present invention relates to an intermittent switching power supply circuit including a protection circuit and prevents excessive output power on a secondary output side. An output power monitoring circuit monitors an output power from a rectifying/smoothing circuit. A protection circuit outputs a stop control signal to a control terminal of an intermittent oscillator when the output power monitoring circuit determines that the output power exceeds a reference power. The protection circuit and a photocoupler receiver element connect in parallel to the control terminal. Where a circuit error occurs and the photocoupler receiver element fails to output a stop control signal to the control terminal, the protection circuit provides a backup and outputs a stop control signal to stop oscillation of the intermittent oscillator element.

According to an embodiment of the present invention there is provided an intermittent switching power supply circuit, comprising: a control terminal controlling an intermittent oscillator and driving an output power, a rectifying-smoothing circuit smoothing the output power, output power monitoring means for monitoring the output power and for sending a stop control to a photocoupler emitter element when the:output power exceeds a reference power, a photocoupler receiver element, the photocoupler receiver element photocoupled to the photocoupler emitter element and controlling a control terminal of the intermittent oscillator when the output power exceeds the reference power, protection circuit means for outputting a back-up stop control signal to the control terminal when the output power monitoring means determines that the output power exceeds a reference power, the protection circuit means connecting in parallel with the photocoupler receiver element, and the protection circuit means outputting the back-up stop control signal to the control terminal and stopping the intermittent oscillator when a failure occurs even when the photocoupler receiver element fails to control the intermittent oscillator, whereby the intermittent switching power supply circuit safely controls and stabilizes the output power.

According to another embodiment of the present invention there is provided an intermittent switching power supply circuit, wherein: the output power is at least one of an output voltage and an output current, whereby the intermittent switching power supply circuit is effective to stabilize the at least one of the output voltage and the output current.

According to another embodiment of the present invention there is provided an intermittent switching power supply circuit, wherein: the output monitoring circuit means includes at least a feed back winding, a rectifier diode, a lag network and a pair of voltage-divider resistors, the feedback winding connecting at one end to a low-voltage terminal of a direct current power supply providing the output power, the rectifier diode connecting the other end of the feedback winding, the lag network including a first resistor and a first capacitor, an intermediate tap between the first resistor and the first capacitor, the lag network in series between an output side of the rectifier diode and the low-voltage terminal, a series connection point between the first resistor and the first capacitor, and the pair of voltage-divider resistors connecting in parallel with the first capacitor between the low-voltage terminal and a base of the series connection point.

According to another embodiment of the present invention there is provided an intermittent switching power supply circuit, further comprising: a protection transistor in the protection circuit means, the protection transistor connecting the control terminal of the intermittent oscillator and the low-voltage terminal, a base of the protection transistor connecting the intermediate tap, a discharge transistor connecting between the series connection point and the low-voltage terminal, a second base on the discharge transistor, and the photocoupler receiver element connecting between a base of the second base of the discharge transistor and the control terminal.

According to another embodiment of the present invention there is provided an intermittent switching power supply circuit, having an output voltage and an output current and controlling an oscillation interval of a primary winding of a transformer, comprising: a rectifying-smoothing circuit, the rectifying-smoothing circuit rectifying and smoothing the output voltage and the output current, output power monitoring means for monitoring the output voltage and the output current from the rectifying-smoothing circuit, the output power monitoring means operating a photocoupler emitter element and generating a stop output signal to a control terminal of an intermittent oscillator if either one of the output voltage and the output current exceeds a reference value, the intermittent oscillator in series with the primary winding and a low-voltage terminal of an external direct current power supply, the control terminal controlling the intermittent oscillator, a photocoupler receiver element photocoupled with the photocoupler emitter element effective to transmit the stop output signal to the control terminal, a protective circuit connecting parallel with the photocoupler receiver element to the control terminal, and the protection circuit effective to output a backup stop control signal to the control terminal when the output monitoring determines that the one of the output voltage and the output current exceeds the reference value, whereby excessive output power is minimized and stabilized even during a circuit failure.

According to another embodiment of the present invention there is provided an intermittent switching power supply circuit, further comprising: a secondary winding on the transformer, the output power monitoring means on a primary side of the transformer, a feedback winding in the output power monitoring means, the feedback winding having a first end connecting to the low-voltage terminal, a rectifier diode in the output power monitoring means, the rectifier diode connecting in series to a second end of the feedback winding, a lag network in the output power monitoring means, the lag network in series with the rectifier diode, the lag network including at least a first resistor and a first capacitor, the first resistor and the first capacitor in series with an output side of the rectifier diode, a pair of voltage-divider resistors in the output power monitoring means, at least a first series connection point in series between the pair of voltage-divider resistors, and the pair of voltage-divider resistors connecting in parallel with the first capacitor between the low-voltage terminal of the external direct current power supply and the series connection point between the first resistor and the first capacitor.

According to another embodiment of the present invention there is provided an intermittent switching power supply circuit, wherein: the protection circuit includes a protection transistor, the protection transistor connecting the control terminal and the low-voltage terminal of the external direct current power supply, a base on the protection transistor, and the base connecting at an intermediate tap between the pair of the voltage-divider resistors.

According to another embodiment of the present invention there is provided an intermittent switching power supply circuit, further comprising: a discharge transistor, a base on the discharge transistor, the discharge transistor in series between the series connection point and the ow voltage terminal, and the photocoupler receiver element connecting the base of the discharge transistor and the control terminal of the intermittent oscillator, whereby the intermittent switching power supply circuit provides double control to the oscillation interval of the primary winding and stabilizing protection to the output voltage and the output current.

According to another embodiment of the present invention there is provided an intermittent switching power supply circuit, comprising: a transformer including a secondary winding, a rectifying-smoothing circuit monitoring output from the secondary winding, output monitoring circuit means for monitoring the output power and sending a stopping signal to the transformer when the output exceeds a reference output, and protective circuit outputting means for sending a back-up stopping signal to the transformer when the output exceeds the reference output, whereby the protective circuit outputting means provides a safe and simple way to protect the intermittent switching power supply circuit from damage during element failure.

According to another embodiment of the present invention there is provided an intermittent switching power supply circuit, having an output voltage and output current and controlling an oscillation interval of a primary winding, comprising: a rectifying-smoothing circuit, output power monitoring means for monitoring the output voltage and the output current from the rectifying-smoothing circuit, means for determining if the output exceeds a reference value, the means for determining in the output monitoring means, an intermittent oscillator in series with the primary winding, a control terminal controlling the intermittent oscillator controlling the oscillation interval of the primary winding, protection circuit means for controlling the control terminal when the output exceeds the reference value, and the protection circuit means effective to output a stop control signal to the control terminal when the means for determining determines that the output power exceeds the reference power, whereby excessive output power is minimized and the output power is stabilized even during a circuit failure.

According to another embodiment of the present invention there is provided an intermittent switching power supply circuit, controlling a circuit oscillation interval of a primary winding and stabilizing at least one of an output voltage and an output current, comprising: an intermittent oscillator controlling the circuit oscillation interval of the primary winding and the intermittent switching power supply circuit, a control terminal on an intermittent oscillator for controlling the intermittent oscillator and for turning off the intermittent oscillator upon receipt of a control signal, output monitoring means for monitoring the output voltage and the output current and providing the control signal to the control terminal if at least one of the output voltage and the output current exceeds a reference value, and protective circuit means for providing a back up monitoring of the output voltage and the output current and providing a back up to the control signal if the at least one output voltage and current exceeds the reference value, whereby the protective circuit ensures protection of the intermittent switching power supply circuit and stability of the output voltage and the output current.

According to another embodiment of the present invention there is provided an intermittent switching power supply circuit, controlling an oscillation interval of a primary winding and stabilizing an output voltage and an output current in a secondary winding comprising: a transformer includes the primary and the secondary output winding, an intermittent oscillator is connected in series between the primary winding and an external direct current power supply, the intermittent oscillator providing the oscillation interval and ceasing the providing when a stop control signal is received at a control terminal, a rectifying-smoothing circuit, the rectifying-smoothing circuit rectifying and smoothing at least one of the output voltage and the output current from the secondary output winding, an output monitoring circuit monitoring the output voltage and an output current from the rectifying-smoothing circuit and operating a photocoupler emitter element and outputting a limit signal if at least one of the output voltage and the output current exceeds a reference value, a photocoupler receiver element photocoupled with the photocoupler emitter element, the photocoupler receiver element outputting a stop control signal to the control terminal of the intermittent oscillator when the limit signal is received from the photocoupler emitter element, an output power monitoring circuit monitoring output power from the rectifying-smoothing circuit, a protective circuit outputting a control signal to the control terminal when the output monitoring circuit detects that at least one of the output voltage and the output current exceeds a reference value, and the protective circuit connecting to the control terminal in parallel with the photocoupler receiver element, whereby the output voltage and the output current are stabilized and controlled effectively.

According to another embodiment of the present invention there is provided an intermittent switching power supply circuit, wherein: the output power monitoring circuit is disposed on a primary side of aid transformer, the output power monitoring circuit includes a feedback winding connected at one end of the feed back winding to a low-voltage terminal of the external direct current power supply, the output power monitoring circuit includes a rectifier diode connected the another end of the feedback winding, the output power monitoring circuit includes a lag network, the lag network including at least a first resistor and a first capacitor connected in series between an output side of the rectifier diode and the low-voltage terminal of the direct current power supply, the output monitoring circuit includes a pair of voltage-divider resistors, the pair of voltage-divider resistors connecting in parallel with the first capacitor between the low-voltage terminal and a series connection point, the series connection point between the first resistor and the first capacitor, the protection circuit including a protection transistor, the protection transistor connecting the control terminal of the intermittent oscillator and the low-voltage terminal of the external direct current power supply, a first base in the protection transistor, the first base connecting to the intermediate tap of pair of the voltage-divider resistors, a discharge transistor, the discharge transistor connecting between the series connection point of the first resistor and the first capacitor and the low-voltage terminal of the external direct current power supply, and the photocoupler receiver element connecting between a second base of the discharge transistor and the control terminal.

The intermittent switching power supply circuit further includes: an output power monitoring circuit monitoring output power from the rectifying/smoothing circuit; and a protective circuit outputting a stop control signal to the control terminal of the intermittent oscillator when the output monitoring circuit detects that the output power exceeds a reference power. The protective circuit is connected to the control terminal in parallel with the photocoupler receiver element.

If either the output voltage or the output current exceeds the reference voltage or the reference current, the oscillation of the intermittent oscillator stops. Oscillation is resumed when the voltage or current drops to or below the reference voltage or the reference current. Thus, the output voltage and the output current remain stable around the predetermined reference voltage or reference current.

If any of the circuit elements malfunctions so that the photocoupler receiver element does not output a stop control signal to the control terminal of the intermittent oscillator even when the voltage or current exceeds the reference voltage or reference current, the increased output power exceeding a reference power is detected by the output power monitoring circuit. A stop control signal is output from the protection circuit to the control terminal of the intermittent oscillator element regardless o the output from the photocoupler receiver element. As a result, the oscillation of the intermittent oscillator stops and output power is reduced before excessive output power is generated.

A flyback voltage is generated at the feedback coil when the intermittent oscillator is oscillating. This flyback voltage charges the capacitor in the lag network by way of the rectifier. A charge voltage proportional to the secondary output power occurs across the capacitor.

During normal operation of the switching power supply, each time the photocoupler receiver element receives a limit signal, the base of the discharge transistor and the control terminal of the intermittent oscillator are made continuous. This causes a bias to be applied to the base of the discharge transistor, activating the transistor. As a result, the charge voltage in the capacitor in the lag network is discharged through the low-voltage terminal of the direct current power supply by way of the discharge transistor.

At the same time, current flows through the base of the discharge transistor and a stop control signal is sent in the form of a fixed current to the control terminal of the intermittent oscillator. This causes oscillation to stop and provides stable output voltage and output current control.

If any of the circuit elements malfunctions so that the photocoupler receiver element does not output a stop control signal to the control terminal even when the voltage or current exceeds the reference voltage or reference current, the charge voltage in the capacitor increases proportionally to the output power rather than being discharged through the discharge transistor. The charge voltage in the capacitor is divided by the divider resistors and is sent to the base of the protection transistor through the intermediate tap.

Thus, by setting up the potential generated proportionally to the reference voltage at the intermediate tap to reach the operation point of the protection transistor, the protection transistor can be activated when the output power exceeds the reference power, causing a fixed current to flow from the control terminal to the low-voltage terminal of the direct current power supply. As a result, the control terminal would receive a stop control signal regardless of the operations of the photocoupler receiver element, the oscillation of the intermittent oscillator would stop, and an excessive power output would be prevented.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is a conventional waveform diagram of the voltage at terminals of an intermittent oscillator when there is a 3 W load.

FIG. 6 is a conventional waveform diagram of the voltage at terminals of an intermittent oscillator when no load exists.

DETAILED DESCRIPTION OF THE PREFERRED EMBODIMENTS

Figure 1:
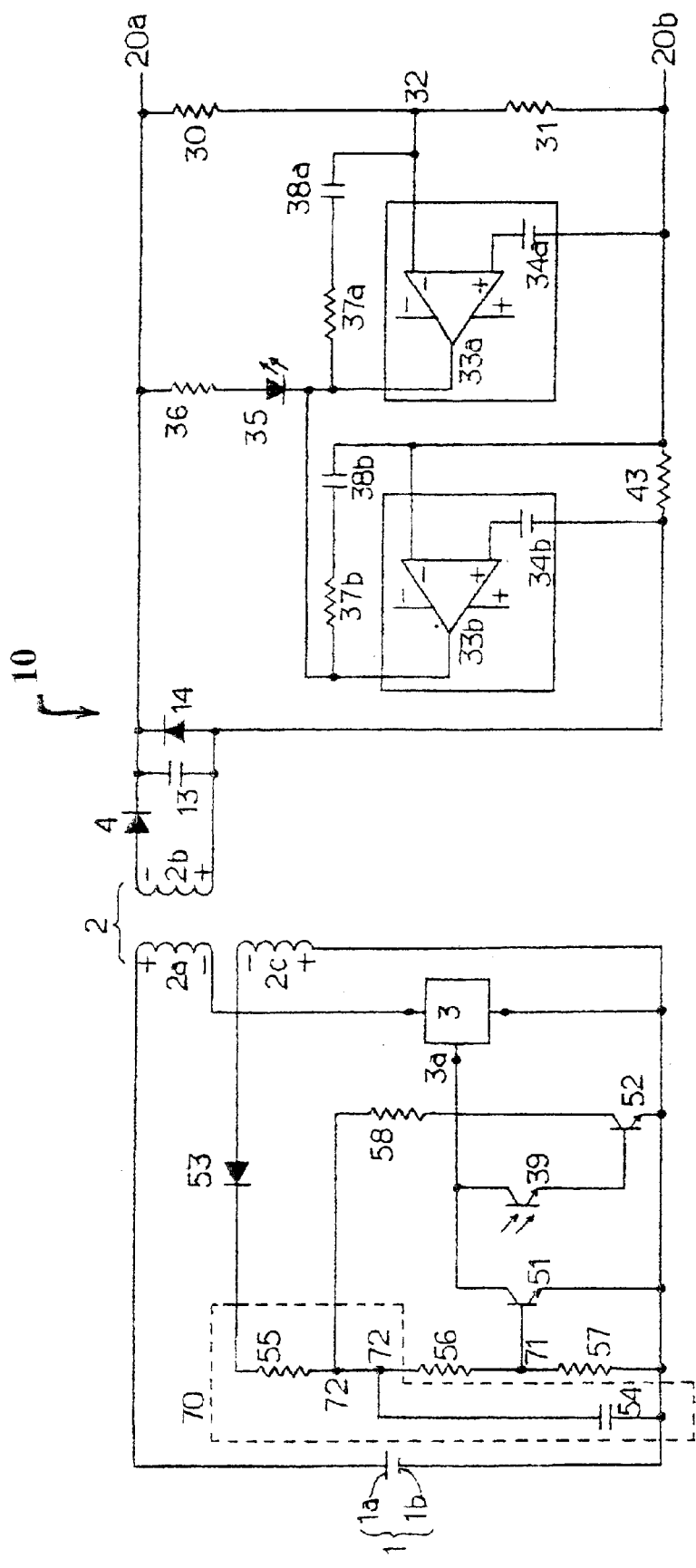
FIG. 1 is a circuit diagram of power supply according to an embodiment of the present invention.

Referring now to FIG. 1, an intermittent switching power supply circuit 10, according to an embodiment of the present invention, includes an output power monitoring circuit and a protection circuit, described later. Common elements identical to those from conventional circuit 100 are assigned like reference numerals and the corresponding descriptions are omitted.

Intermittent switching power circuit 10 includes intermittent oscillator 3. Intermittent oscillator 3 includes control terminal 3a. Control terminal 3a controls the operation of intermittent oscillator 3. Intermittent oscillator 3 is connected between a terminal of primary winding 2a and low voltage terminal 1b of direct current power supply 1.

During operation, oscillation of intermittent oscillator 3 turns current flowing through primary winding 2a on and off, as will be described. Intermittent oscillator 3 oscillates to supply output power as needed, when a current signal is absent at control terminal 3a and stops oscillation when a fixed current (limit signal) flows is applied to control terminal 3a.

Transformer 2 also includes a feedback winding 2c on the primary side. Feedback winding 2c is connected on one end to low-voltage terminal 1b of direct current power supply 1. The other end of feedback winding 2c is connected to a rectifier diode 53. Rectifier diode 53 serves as a rectifier element to a lag network 70. Lag network 70 is an integrator which includes a resistive ladder consisting of resistors 55, 56 and 57 connected between the anode of rectifier diode 53 and low-voltage terminable 1b. A capacitor 54 is connected from the connection point 72 of resistors 55 and 56. A connection point 71 of resistors 56 and 57 is connected to a base of a transistor 51. The emitter of transistor 51 is connected to low-voltage terminal 1b. The collector of transistor 51 is connected to the collector of photocoupler receiver element 39 and to control terminal 3. The emitter of photocoupler receiver element 39 is connected to the base of a transistor 51. The emitter of transistor 52 is connected to low-voltage terminal 1b. The collector of transistor 52 is connected through a resistor 58 to connection point 72.

During operation, a flyback voltage is generated in feedback winding 2c when current stops flowing in primary winding 2a. Only the current from the flyback voltage is sent to lag network 70. Feedback winding 2c, rectifier diode 53, resistor 55, and capacitor 54, form a closed loop with low-voltage terminal 1b.

Resistors 56 and 57 form a voltage divider, which, with feedback winding 2c, rectifier diode 53, and lag network 70 form an output power monitoring circuit. The resistances of voltage-divider resistors 56, 57 are set at predetermined high values that prevent the charge in capacitor 54 from discharging there through.

Transistor 52 is a discharge transistor 52 which discharges the charge in capacitor 54 to low-voltage terminal 1b during normal operation of switching power supply circuit 1.

During operation, when photocoupler receiver element 39 receives a limit signal output from photocoupler emitter element 35 (i.e., the light emitted from photocoupler emitter element 35) in response to output voltage and/or current exceeding their limits, a bypass voltage is applied to discharge transistor 52. The bypass voltage to discharge transistor 52 turns discharge transistor 52 on, thereby discharging capacitor 54.

The base of protection transistor 51 is connected to intermediate tap 71. During operation, switching control of protection transistor 51 is controlled by the voltage at intermediate tap 71.

The resistances of voltage-divider resistors 56, 57 and the circuit constant of lag network 70 are preselected so that, if a reference power lower than that determined to be an irregular output (namely, output power in which either the output voltage or current exceeds a corresponding reference value) occurs on the secondary-side output, the voltage at intermediate tap 71 reaches the operating point of protection transistor 51. Since the operating point of protection transistor 51 is matched, when output power reaches the reference power level, discharge transistor 52 turns on.

During operation, protection transistor 51 forms a protective circuit which sends a stop control signal to control terminal 3a of intermittent oscillator 3 during irregular activity, regardless of the operation of photocoupler receiver element 39, thus forming a double-safety backup.

The output side of circuit 10 is the same as the output side of conventional intermittent switching power supply circuit 100, and is not further described.

Next, operation of intermittent switching power supply circuit 10 is described.

During normal operation, when the secondary output voltage and current are at or below the predetermined reference voltage and current, intermittent oscillator 3 oscillates at a fixed frequency switch DC power to primary winding 2a of transformer 2 on and off. During this normal operation, the output power from secondary output winding 2b increases.

Where current flowing through primary winding 2a of transformer 2 stops, a load between high-voltage output line 20a and low-voltage output line 20b is generated at feedback winding 2c, i.e. the flyback voltage proportional to the output voltage.

The flyback voltage generated at feedback winding 2c charges capacitor 54 through resistor 55 at a rate determined by the time constant of the RC (resistance-capacitance) circuit. The voltage across capacitor 54 gradually increases toward a voltage related to the output voltage.

Figure 2:
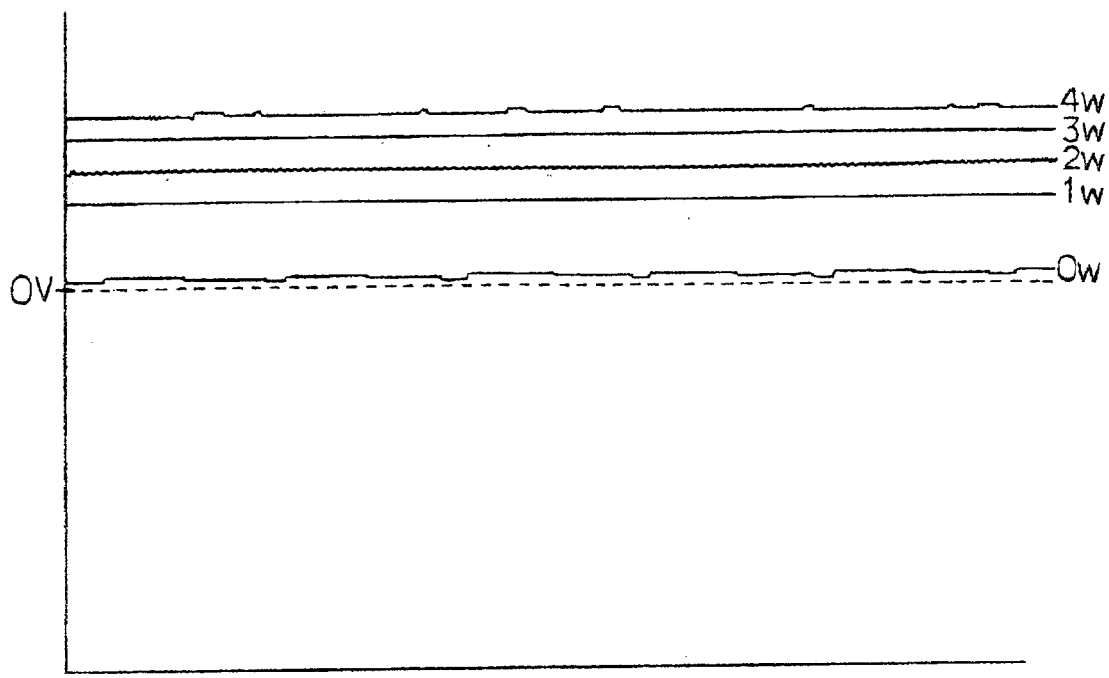
FIG. 2 is a waveform diagram of voltage between terminals of a capacitor when a load on the secondary side is varied and photocoupler receiver element is inactive.

Referring now to FIG. 2, a graph displays the voltage between the terminals of capacitor 54, when photocoupler receiver element 39 is inactive, and the load connected to the secondary side. The output power is varied from 0 W to 4 W with minimal variation. As shown, the voltage between the terminals of capacitor 54 increases as the output power increases.

The divided voltage sent to the inverted input terminal of error amplifier 33a increases when the output voltage flowing through high-voltage output line 20a and low-voltage output line 20b increases beyond the predetermined reference voltage.

Once the predetermined reference voltage is exceeded, the potential difference of the first comparison voltage of voltage monitoring reference power supply 34a is inversely amplified providing a voltage that exceeds the emission threshold value of photocoupler emitter element 35.

Similarly, where the output current flowing through high-voltage output line 20a and low-voltage output line 20b increases beyond the predetermined reference current, the potential difference between the ends of current detection resistor 43 increases, thereby increasing the voltage applied to the inverse input terminal of error amplifier 33b. The voltage difference with the second comparison voltage is inversely amplified providing voltage that exceeds the emission threshold value of photocoupler emitter element 35.

In sum, whenever either the output voltage or the output current exceeds the corresponding reference voltage or current, photocoupler emitter element 35 sends a limit signal (in this case a continuous emission) to photocoupler receiver element 39 to indicate that the reference value is exceeded.

When photocoupler receiver element 39 receives the limit signal from photocoupler emitter element 35, photocoupler receiver element 39 shorts control terminal 3a of intermittent oscillator 3 and low-voltage terminal 1b of direct current power supply 1. As a result, a forward bias voltage sufficient for activation is applied to the base of discharge transistor 52.

When discharge transistor 52 activates (is turned on), resistor 58 shorts series connection point 72, of lag network 70, and low-voltage terminal 1b. This operation causes capacitor 54, (charged by the flyback voltage), to discharge toward low-voltage terminal 1b.

Figure 3:
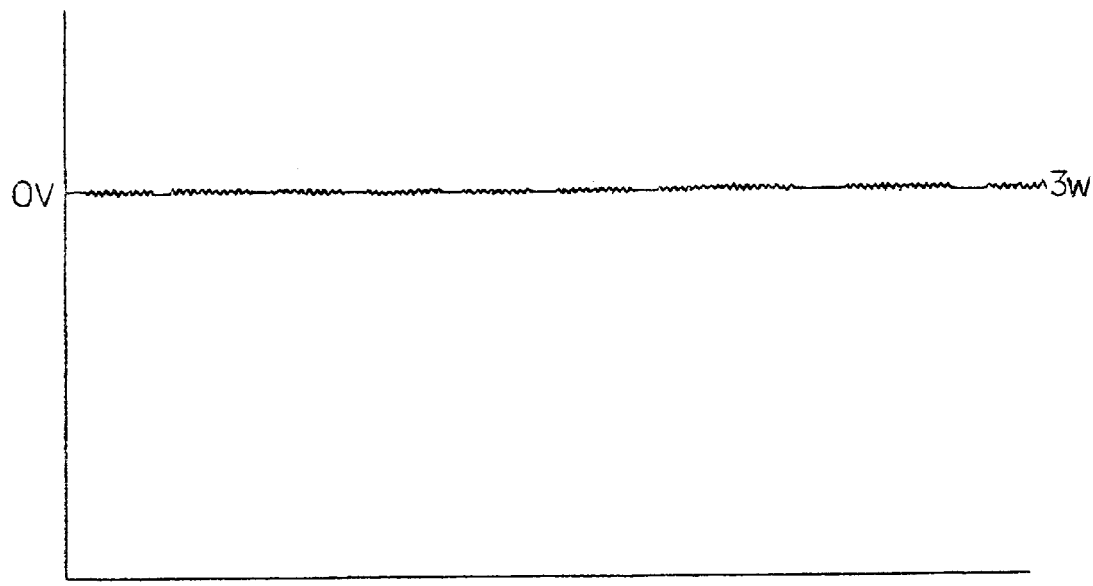
FIG. 3 is a waveform diagram of the voltage between the terminals of the capacitor when a photocoupler receiver element is operating normally.
Figure 4:
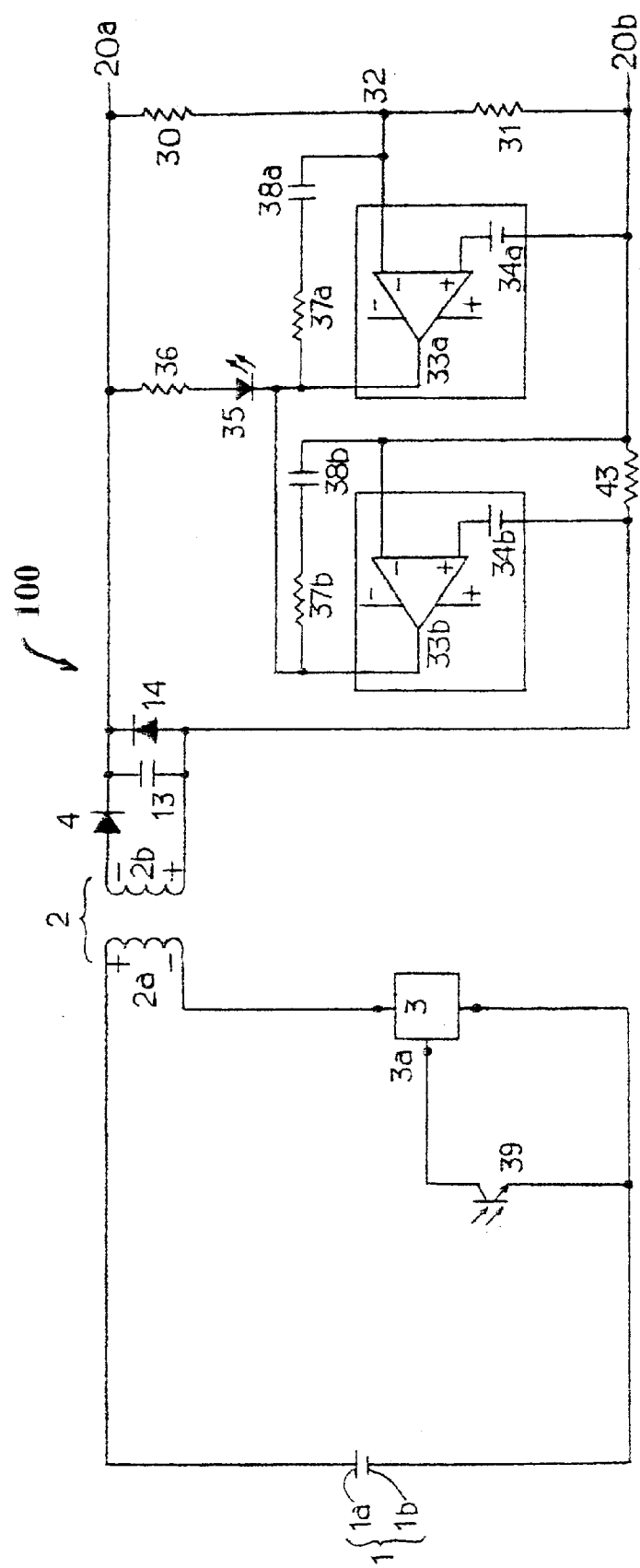
FIG. 4 is a diagram of a conventional intermittent switching power supply circuit.

Referring now to FIG. 3, a graph indicates voltages at the terminals of capacitor 54 during normal operation while photocoupler receiver element 39 operates. As FIG. 3 shows, capacitor 54 is repeatedly charged and discharged so that the voltage at the terminals does not increase beyond roughly 0 V even though there is a 3 W load on the secondary side.

Activation of discharge transistor 52 causes, through photocoupler receiver element 39, a fixed current to flow through low-voltage terminal 1b from control terminal 3a of intermittent oscillator 3. Upon this activation, control terminal 3a receives a stop control signal. Upon receipt of the stop control signal, intermittent oscillator 3 stops oscillation until the stop control signal is no longer received, i.e., until photocoupler receiver element 39 stops receiving emissions.

When intermittent oscillator 3 stops oscillating, secondary output winding 2b of transformer 2 no longer generates output power, and the output voltage or output current, which had previously exceeded the respective reference value, naturally decreases until it drops below the reference value.

As the output value decreased below the reference, photocoupler emitter element 35 stops emission and stops receiving the limit signal. Current flowing through control terminal 3a stops and intermittent oscillator 3 resumes oscillation. In this manner, intermittent oscillator 3 repeatedly stops and starts oscillation and provides a stable output based on the load power provided.

During normal operation, capacitor 54 of lag network 70, is regularly discharged by the flyback voltage before its voltage is high enough to turn on discharge transistor 52. Thus, protection transistor 51 remains in activate.

In certain circumstances, due to circuit irregularity or element malfunction, control terminal 3a does not receive a stop control signal from photocoupler emitter element 35 and the output voltage or current exceeds the reference value. In such a circumstance, since intermittent oscillator 3 continues oscillating and the output power increases, discharge transistor 52 is not activated. As a result, the load on capacitor 54 of lag network 70 is not discharged from discharge transistor 52 and the charge voltage of capacitor 54 increases. Similarly, the voltage at intermediate tap 71 between voltage-divider resistors 56, 57 increases.

Fortunately, when the output power exceeds the reference power long enough to permit charging of capacitor 54, the voltage, applied from intermediate tap 71 to the base of protection transistor 51, exceeds the operating point of protection transistor 51, and protection transistor 51 turns on.

Since protection transistor 51 is now active, a fixed current flows from control terminal 3*a* to low-voltage terminal 1*b* and intermittent oscillator 3 assumes a stop signal is received and stops oscillation. Thus, the circuit is stopped before excessive output power is generated.

It is also possible to add an additional warning or alarm notification circuit (not shown in FIG. 1) to intermittent switching power supply circuit 10 to indicate by an audible or visual alarm, the presence of an irregularity when discharge transistor 52 activates, thus providing additional security.

In the embodiment described above, the charge voltage of capacitor 54 is divided by voltage-divider resistors 56, 57 to intermediate tap 71. The divided voltage from intermediate tap 71 is applied to the base of discharge transistor 52. In an alternative embodiment, it is also possible to connect the base of discharge transistor 52 directly to series connection point 72 by adjusting the circuit constant of lag network 70.

In the embodiment described above, emission from the photocoupler emitter element 35 is used as a limit signal, but it would also be possible to have cessation of emission considered the limit signal. Similarly, a fixed current flowing through the control terminal 3*a* is treated as a stop control signal to stop oscillation of the intermittent oscillator 3, but other signal formats can be used for the stop control signal as long as they control the operations of the photocoupler receiver element 39 and the protection transistor 51 in the manner described.

With the present invention, an output power monitoring circuit and a protection circuit provide a safe intermittent switching power supply circuit 10 that does not generate excessive output power on a secondary side even upon failure of a circuit element.

Further, since the feedback coil generates a flyback voltage proportional to the output power, the flyback voltage may be used to charge a capacitor. This allows monitoring of output power with a simple structure capable of monitoring the charge voltage.

As an overview, intermittent switching power supply circuit 10 includes a protection circuit that prevents excessive output power on a secondary side even when there is failure of a circuit element.

In sum, intermittent switching power supply circuit 10 controls the oscillation interval of primary winding 2*a* to stabilize an output voltage and output current.

The output power monitoring circuit includes feedback winding 2*c*, rectifier diode 53 and lag network 70. The rectifying/smoothing circuit includes diode 4 and smoothing capacitor 13. The output monitoring circuit monitors output power from the rectifying/smoothing circuit.

A protection circuit, including protection transistor 51, outputs a stop control signal to control terminal 3*a* of intermittent oscillator 3 if the output power monitoring circuit determines that the output power exceeds a reference power for a predetermined time. The protection circuit is connected in parallel with photocoupler receiver element 39 to control terminal 3*a*.

During operation, if a circuit element malfunctions and photocoupler receiver element 39 does not output a stop control signal to control terminal 3*a*, the protection circuit outputs a stop control signal to stop the oscillation of intermittent oscillator element 3, thereby protecting the circuit.

During operation, when the output power exceeds the reference power, the charge voltage of the capacitor is used to simply activate the protection transistor and stop the intermittent oscillator. The result is a simple circuit that may be used to reliably stop circuit operations before excessive and damaging output power exists.

It is known that the formula for electrical power is current multiplied by voltage. Where output power is described above, the phrase may be interchanged with output current and output voltage through the simple application of the formula.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of the wooden part together, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A intermittent switching power supply circuit, comprising:
   a control terminal controlling an intermittent oscillator and producing an output power;
   a rectifying-smoothing circuit smoothing said output power;
   output power monitoring means for monitoring said output power and for sending a stop control to a photocoupler emitter element when said output power exceeds a reference power;
   a photocoupler receiver element;
   said photocoupler receiver element photocoupled to said photocoupler emitter element and controlling a control terminal of said intermittent oscillator when said output power exceeds said reference power;
   protection circuit means for outputting a back-up stop control signal to said control terminal when said output power monitoring means determines that said output power exceeds a reference power;
   said protection circuit means being connected in parallel with said photocoupler receiver element; and said protection circuit means outputting said back-up stop control signal to said control terminal and stopping said intermittent oscillator when a failure occurs even when said photocoupler receiver element fails to control said intermittent oscillator, whereby said intermittent switching power supply circuit safely controls and stabilizes said output power.

2. An intermittent switching power supply circuit, according to claim 1, wherein:

said output power is at least one of an output voltage and an output current, whereby said intermittent switching power supply circuit is effective to stabilize said at least one of said output voltage and said output current.

3. An intermittent switching power supply circuit, according to claim 2, wherein:

said output monitoring circuit means includes at least a feed back winding, a rectifier diode, a lag network and a pair of voltage-divider resistors;

said feedback winding connecting at one end to a low-voltage terminal of a direct current power supply providing said output power;

said rectifier diode connecting said other end of said feedback winding;

said lag network including a first resistor and a first capacitor;

a series connection point between said first resistor and said first capacitor;

said lag network in series between an output side of said rectifier diode and said low-voltage terminal;

an intermediate tap between said pair of voltage-divider resistors; and said pair of voltage-divider resistors connecting in parallel with said first capacitor between said low-voltage terminal and a base of said series connection point.

4. An intermittent switching power supply circuit, according to claim 3, further comprising:

a protection transistor in said protection circuit means;

said protection transistor connecting said control terminal of said intermittent oscillator and said low-voltage terminal;

a base of said protection transistor connecting said intermediate tap;

a discharge transistor connecting between said series connection point and said low-voltage terminal;

a second base on said discharge transistor; and said photocoupler receiver element connecting between a base of said second base of said discharge transistor and said control terminal.

5. An intermittent switching power supply circuit, having an output voltage and an output current and controlling an oscillation interval of a primary winding of a transformer, comprising:

a rectifying-smoothing circuit;

said rectifying-smoothing circuit rectifying and smoothing said output voltage and said output current;

output power monitoring means for monitoring said output voltage and said output current from said rectifying-smoothing circuit;

said output power monitoring means operating a photocoupler emitter element and generating a stop output signal to a control terminal of an intermittent oscillator if either one of said output voltage and said output current exceeds a reference value;

said intermittent oscillator in series with said primary winding and a low-voltage terminal of an external direct current power supply;

a photocoupler receiver element photocoupled with said photocoupler emitter element effective to transmit said stop output signal to said control terminal;

said control terminal controlling said intermittent oscillator;

a protective circuit connecting parallel with said photocoupler receiver element to said control terminal; and said protection circuit effective to output a backup stop control signal to said control terminal when said output monitoring determines that said one of said output voltage and said output current exceeds said reference value, whereby excessive output power is minimized and stabilized even during a circuit failure.

6. An intermittent switching power supply circuit, according to claim 5, further comprising:

a secondary winding on said transformer;

said output power monitoring means on a primary side winding of said transformer;

a feedback winding in said output power monitoring means;

said feedback winding having a first end connecting to said low-voltage terminal;

a rectifier diode in said output power monitoring means;

said rectifier diode connecting in series to a second end of said feedback winding;

a lag network in said output power monitoring means;

said lag network in series with said rectifier diode;

said lag network including at least a first resistor and a first capacitor;

said first resistor and said first capacitor in series with an output side of said rectifier diode;

a pair of voltage-divider resistors in said output power monitoring means;

at least an intermediate tap in series between said pair of voltage-divider resistors; and said pair of voltage-divider resistors connecting in parallel with said first capacitor between said low-voltage terminal of said external direct current power supply and a series connection point between said first resistor and said first capacitor.

7. An intermittent switching power supply, according to claim 6, wherein:

said protection circuit includes a protection transistor;

said protection transistor connecting said control terminal and said low-voltage terminal of said external direct current power supply;

a base on said protection transistor; and said base connecting at an intermediate tap between said pair of said voltage-divider resistors.

8. An intermittent switching power supply, according to claim 7, further comprising:

a discharge transistor;

a base on said discharge transistor;

said discharge transistor in series between said series connection point and said low voltage terminal; and said photocoupler receiver element connecting said base of said discharge transistor and said control terminal of said intermittent oscillator, whereby said intermittent switching power supply circuit provides double control to said oscillation interval of said primary winding and stabilizing protection to said output voltage and said output current.

9. An intermitted switching power supply circuit, having an output voltage and output current and controlling an oscillation interval of a primary winding, comprising:

a rectifying-smoothing circuit;

output power monitoring means for monitoring said output voltage and said output current from said rectifying-smoothing circuit;

a feedback winding in said output monitoring circuit, wherein said feedback winding creates a flyback voltage proportional to the power output;

means for determining in said output monitoring means;

an intermittent oscillator in series with said primary winding;

a control terminal controlling said intermittent oscillator controlling said oscillation interval of said primary winding;

protection circuit means for controlling said control terminal when said output exceeds said reference value; and said protection circuit means effective to output a stop control signal to said control terminal when said means for determining determines that said output power exceeds said reference power is stabilized even during a circuit failure.

10. An intermittent switching power supply circuit, controlling a circuit oscillation interval of a primary winding and stabilizing at least one of an output voltage and an output current, comprising:

an intermittent oscillator controlling said circuit oscillation interval off said primary winding and said intermittent switching power supply circuit;

a control terminal on an intermittent oscillator for controlling said intermittent oscillator and for turning off oscillator upon receipt of a control signal;

output monitoring means for monitoring said output voltage and said output current and providing said control signal to said control terminal if at least one of said output voltage and said output current exceeds a reference value;

a feedback winding in said output monitoring means, wherein said feedback winding creates a flyback voltage proportional to the power output; and protective circuit means for providing a back up monitoring of said output voltage and said output current and providing a back up to said control signal if said at leas one output voltage and current exceeds said reference value, whereby said protective circuit ensures protection of said intermittent switching power supply circuit and stability of said output voltage and said output current.

11. An intermittent switching power supply circuit, controls an oscillation interval of a primary winding and stabilizes an output voltage and an output current in a secondary winding comprising:

a transformer includes said primary and said secondary output winding;

an intermittent oscillator is connected in series between said primary winding and an external direct current power supply;

said intermittent oscillator providing said oscillation interval and ceasing said providing when a stop control signal is received at a control terminal;

a rectifying-smoothing circuit;

said rectifying-smoothing circuit rectifying and smoothing at least one of said output voltage and said output current from said secondary output winding;

an output monitoring circuit monitoring said output voltage and an output current from said rectifying-smoothing circuit and operating a photocoupler emitter element and outputting a limit signal if at least one of said output voltage and said output current exceeds a reference value;

a photocoupler receiver element photocoupled with said photocoupler emitter element;

said photocoupler receiver element outputting a stop control signal to said control terminal of said intermittent oscillator when said limit signal is received from said photocoupler emitter element;

an output power monitoring circuit monitoring output power from said rectifying-smoothing circuit;

a protective circuit outputting a control signal to said control terminal when said output monitoring circuit detects that at least one of said output voltage and said output current exceeds a reference value; and said protective circuit connecting to said control terminal in parallel with said photocoupler receiver element, whereby said output voltage and said output current are stabilized and controlled effectively.

12. An intermittent switching power supply circuit as described in claim 11, wherein:

said output power monitoring circuit is disposed on a primary side of aid transformer;

said output power monitoring circuit includes a feedback winding connected at one end of said feed back winding to a low-voltage terminal of said external direct current power supply;

said output power monitoring circuit includes a rectifier diode connected said another end of said feedback winding;

said output power monitoring circuit includes a lag network;

said lag network including at least a first resistor and a first capacitor connected in series between an output side of said rectifier diode and said low-voltage terminal of said direct current power supply;

said output monitoring circuit includes a pair of voltage-divider resistors;

said pair of voltage-divider resistors connecting in parallel with said first capacitor between said low-voltage terminal and a series connection point;

said series connection point between said first resistor and said first capacitor;

said protection circuit including a protection transistor;

said protection transistor connecting said control terminal of said intermittent oscillator and said low-voltage terminal of said external direct current power supply;

a first base in said protection transistor;

said first base connecting to said intermediate tap of pair of said voltage-divider resistors;

a discharge transistor;

said discharge transistor connecting between said series connection point of said first resistor and said first capacitor and said low-voltage terminal of said external direct current power supply; and said photocoupler receiver element connecting between a second base of said discharge transistor and said control terminal.

13. An intermittent power supply comprising:

an intermittent oscillator;

means responsive to at least one of an output current exceeding a predetermined output current and an output voltage exceeding a predetermined output voltage for stopping said intermittent oscillator, and restarting said intermittent oscillator when said output voltage and said output current are reduced below predetermined values, whereby said intermittent oscillator normally cycles on and off;

said means further comprising a feedback winding, wherein said feedback winding creates a flyback voltage proportional to the output power;

an integrator;

said integrator including a capacitor charged when said intermittent oscillator is turned off;

said integrator having a time constant exceeding a normal cycle time of intermittent operation of said intermittent oscillator;

a control element;

means for activating said control element when a charge in said capacitor exceeds a turn-on value; and said control element including means for maintaining said intermittent oscillator in a quiescent condition when activated, whereby, in the absence of regular cycling of said intermittent oscillator, said intermittent oscillator remains quiescent.

* * * * *